(12) United States Patent
Mikhael et al.

(10) Patent No.: US 9,558,679 B2
(45) Date of Patent: Jan. 31, 2017

(54) ULTRA-BRIGHT PASSIVATED ALUMINUM NANO-FLAKE PIGMENTS

(71) Applicants: Michael G. Mikhael, Tucson, AZ (US); Angelo Yializis, Tucson, AZ (US)

(72) Inventors: Michael G. Mikhael, Tucson, AZ (US); Angelo Yializis, Tucson, AZ (US)

(73) Assignee: Sigma Laboratories of Arizona, LLC, Tucson, AZ (US)

( * ) Notice: Subject to any disclaimer, the term of this patent is extended or adjusted under 35 U.S.C. 154(b) by 0 days.

(21) Appl. No.: 14/562,437

(22) Filed: Dec. 5, 2014

(65) Prior Publication Data

US 2015/0111027 A1    Apr. 23, 2015

Related U.S. Application Data

(63) Continuation of application No. 11/335,039, filed on Jan. 18, 2006, now Pat. No. 9,082,320, which is a continuation-in-part of application No. 10/355,373, filed on Jan. 31, 2003, now abandoned.

(51) Int. Cl.

| | | |
|---|---|---|
| C23C 14/00 | (2006.01) | |
| G09C 1/00 | (2006.01) | |
| B22F 9/16 | (2006.01) | |
| C09C 1/00 | (2006.01) | |
| C09D 11/52 | (2014.01) | |
| H01B 1/08 | (2006.01) | |

(Continued)

(52) U.S. Cl.
CPC . *G09C 1/00* (2013.01); *B22F 9/08* (2013.01); *B22F 9/16* (2013.01); *C09C 1/00* (2013.01); *C09D 7/1216* (2013.01); *C09D 11/52* (2013.01); *C23C 14/0005* (2013.01); *H01B 1/08* (2013.01); *C01P 2004/20* (2013.01); *C01P 2006/40* (2013.01); *Y10T 428/256* (2015.01)

(58) Field of Classification Search
None
See application file for complete search history.

(56) References Cited

U.S. PATENT DOCUMENTS

| | | | | |
|---|---|---|---|---|
| 4,065,060 A | * | 12/1977 | Booz | B02C 17/18 |
| | | | | 241/16 |
| 4,218,294 A | * | 8/1980 | Brack | C08F 283/04 |
| | | | | 427/154 |

(Continued)

*Primary Examiner* — Robert Vetere
(74) *Attorney, Agent, or Firm* — Yakov Sidorin; Quarles & Brady LLP

(57) ABSTRACT

An organic release agent is vacuum deposited over a substrate and surface treated with a plasma or ion-beam source in a gas rich in oxygen-based functional groups to harden a very thin layer of the surface of the deposited layer in passivating environment. Aluminum is subsequently vacuum deposited onto the hardened release layer to form a very flat and specular thin film. The film is exposed to a plasma gas containing oxygen or nitrogen to passivate its surface. The resulting product is separated from the substrate, crushed to break up the film into aluminum flakes, and mixed in a solvent to separate the still extractable release layer from the aluminum flakes. The surface treatment of the release layer greatly reduces wrinkles in the flakes, improving the optical characteristics of the flakes. The passivation of the flake material virtually eliminates subsequent corrosion from exposure to moisture.

25 Claims, 2 Drawing Sheets

(51) Int. Cl.
  *B22F 9/08* (2006.01)
  *C09D 7/12* (2006.01)

(56) References Cited

U.S. PATENT DOCUMENTS

| | | | | |
|---|---|---|---|---|
| 5,025,300 A * | 6/1991 | Billig | ............... | H01L 23/5258 257/529 |
| 6,398,999 B1 * | 6/2002 | Josephy | ............... | B22F 1/0007 264/1.1 |
| 2003/0027073 A1 * | 2/2003 | Serizawa | ............... | G03G 9/0804 430/124.1 |

* cited by examiner

ULTRA-BRIGHT PASSIVATED ALUMINUM NANO-FLAKE PIGMENTS

CROSS-REFERENCE TO RELATED APPLICATIONS

This application is a continuation of U.S. Ser. No. 11/335,039, filed on Jan. 18, 2006 and now published as U.S. 2006/0117988 now U.S. Pat. No. 9,082,320, which in turn is a continuation-in-part application of U.S. Ser. No. 10/355,373, filed on Jan. 31, 2003 and now abandoned. The disclosure of each of the above identified applications is incorporated herein by reference.

BACKGROUND OF THE INVENTION

Field of the Invention

This invention is related in general to metallic flakes of reflective, conductive and/or transparent material used in a variety of applications, such as in the manufacture of clear conductive surfaces and inks and paints for highly reflective coatings. In particular, the invention pertains to a method of producing highly reflective, passivated, nano-thick aluminum flakes from metal/organic multilayer structures deposited entirely in a vacuum environment. The multilayer deposition may be carried out either on a web using a roll-to-roll process or on a rotating drum, where thousands of aluminum layers are interleaved with specially prepared organic layers and passivated in vacuum. In either case, the aluminum layers are suitable for reduction to single flakes for the production of highly reflective pigments.

Description of the Related Art

Metallized films are commonly produced for a variety of applications that include decorative, packaging and low-emissivity applications for which high reflectivity is desirable. In conventional metal-flake pigment technology, such as in the production of aluminum pigments, a polymer film web is coated with a dissolvable polymer layer at atmospheric conditions and a nano-thick aluminum layer is deposited over it in a vacuum chamber. This process may be repeated several times on one or both sides of the web before the aluminum is removed from the web and reduced to a nano-flake pigment.

Polymer/aluminum multilayer structures may also be produced entirely in a vacuum chamber by depositing both materials in successive layers. Such structures have been used advantageously in the past to produce aluminum pigments in powder form where the polymer is retained with the aluminum particle (see, for example, U.S. Pat. No. 5,912,069; and A. Yializis, et al., "Low Emissivity Polymer-Metal Pigments and Coatings," 1997 Meeting of The IRIS Group On Camouflage Concealment and Deception, Volume 1, October 1997). The same process has been utilized to manufacture multilayer capacitors (see U.S. Pat. No. 5,018,048, U.S. Pat. No. 5,125,138, and U.S. Pat. No. 5,731,948) wherein the highly cross-linked polymer layers are used as the dielectric between the aluminum electrode layers.

Commonly owned U.S. Pat. No. 6,270,841, herein incorporated by reference, described producing aluminum flakes by evaporating a polyethylene-oligomer in a vacuum chamber, depositing it as a solid coating (0.5 to 1.0 micron thick) on a cold polyester web, and then depositing an aluminum film in-line on top of the oligomer release coating according to conventional vacuum deposition. Aluminum metal flakes were recovered from the bulk deposition product by crushing the aluminum film within it to produce flakes, and then either by melting or dissolving the release material away from the flakes. Similar aluminum-flake products were produced using poly(.alpha.-methylstyrene) oligomers as the release layer. (Aluminum readily oxidizes into a non-conductive material; therefore, it is not suitable for manufacturing conductive layers.)

Metallic particles have also been utilized to manufacture conductive surfaces used in many modern electronic applications. Conductive plates and inks incorporate metal pigments composed of materials such as gold, silver, chromium, palladium, platinum, nickel, indium and copper. Typically, these conductive surfaces are manufactured by dispersing a metallic or metal-oxide powder in a binder and applying the mixture as a coating over a substrate. More recently, for the display industry, clear conductive inks have been developed that utilize micro- and nano-size particles of conductive oxides, such as ITO and IZO. These nano-size powders are manufactured chemically by precipitation from a solution or mechanically by grinding solid nuggets. The resulting powder particles, normally in the order of nanometers in nominal diameter, are not optically transmissive even though the material in thin-film form may be transparent. This is because the light scattering produced by reflection of dispersed random-shape particles greatly reduces the transparency of the bulk material, just as in the case of pulverized glass particles. Therefore, the application of a conductive powder to a clear substrate such as plastic or glass, while producing a conductive surface, tends to yield a translucent but not perfectly clear layer even when ITO or IZO is used.

It has been known that the metal-oxide compounds commonly used in the manufacture of conductive layers, most commonly ITO and IZO, remain transparent in flake form because of the high aspect ratio associated with the flake form (i.e., the ratio of the nominal diameter of the two-dimensional surface to the thickness of the flake). Accordingly, the use of metal-oxide particles in flake form to manufacture clear conductive surfaces is very very desirable.

U.S. Ser. No. 10/355,373, herein incorporated by reference, and U.S. Pat. No. 6,270,841 and U.S. Pat. No. 6,398,999 describe a process for producing such metal flakes. A polymeric release agent is flash-evaporated and deposited onto a support substrate under conventional vacuum-deposition conditions and a pigment (i.e., aluminum) or a conductive-material precursor (e.g., ITO) is subsequently vacuum deposited onto the resulting release layer in the same process chamber to form a very thin film. The resulting multilayer product is then separated from the support substrate, crushed to brake up the film into flakes, and heated or mixed in a solvent to separate the soluble release layer from the flakes. Thus, by judiciously controlling the deposition of pigment (or conductive material) on the release layer, flakes may be obtained with the desired optical and physical characteristics.

As a result of the continuous vacuum deposition of the release layer and the pigment (or conductive material) in rapid succession on a rotating drum to form a continuous two-layer spiral of arbitrary length, the process of Ser. No. 10/355,373 allows the production of a large bulk volume of pigment (or conductive-material) film embedded between release layers, which in turn yields extensive quantities of flakes by crushing the layered product and heating or dissolving the release material.

The flakes so produced are mixed in conventional carriers and binders to make dispersions suitable for application as inks and coatings over clear substrates. Thus, the process of Ser. No. 10/355,373 produces pigment and ITO flakes without also introducing the opacity that is characteristic of the prior-art inks and coatings based on powders. Because of the higher aspect ratio of flakes with respect to powders, the conductive flakes also provide greater contact among adjacent particles and therefore also greater conductivity than is typically achievable by the use of powders.

The technology described in Ser. No. 10/355,373 permitted the manufacture of pigment and conductive flakes, rather than powders, in bulk and in a single process, with the attendant benefits associates with the single-layer flake structure. In particular, these benefits included an expected higher reflectivity or transparency than powders, as applicable (with respect to optical properties), and higher conductivity than powders with respect to applications requiring good conductivity.

Unfortunately, it was discovered that these improved properties deteriorate rapidly as soon as the flakes are utilized as pigments or conductive films. In the case of aluminum pigments, in particular, the flakes lose gloss and brightness immediately upon separation from the release material. Similarly, the conductivity of conductive films tends to decrease with time. The present invention is directed at providing a solution to these problems by perfecting the manufacturing process described in Ser. No. 10/355,373.

SUMMARY

In view of the foregoing, this invention is directed at the development of a general approach to produce an optically flat and dissolvable organic substrate for the deposition of metallic layers in multilayer structures. These metallic/organic composites are produced entirely in a vacuum chamber either by deposition on a web using a roll-to-roll process or by continuous deposition on a rotating drum. In addition, the invention is directed at a process that includes, particularly in the case of aluminum, the passivation of both sides of the aluminum layers before they are exposed to moisture in any form.

It is noted that the term "passivation" is used in the art to refer to the process of treating a metal layer to alter its susceptibility to deterioration from exposure to environmental factors, especially moisture. In order to produce a passivated aluminum coating, it is necessary to create a stable $Al_2O_3$ or AlN protective layer on the surface of the aluminum film. When the film is produced by metallizing a web substrate on a roll in a vacuum chamber and the roll is removed from the chamber, its subsequent exposure to air allows the formation of a protective aluminum oxide layer that heretofore has been deemed adequate in the art. Given that air contains both oxygen and some moisture, though, some deterioration of the aluminum layer takes place immediately, especially when the first exposure of the freshly deposited aluminum layer occurs in a high-humidity environment. This exposure to a combination of air and moisture produces a hydrated aluminum oxide, $Al_2O_3 \cdot (H_2O)$, which is structurally inferior to $Al_2O_3$. Thus, the aluminum material continues to be sensitive to moisture, producing corrosion and reducing the brightness and useful life of reflective aluminum flakes.

In the case of multilayer capacitor structures, the aluminum layers are normally passivated simply by exposure to a high temperature after deposition (which may be done because the interleaved polymer layers are cross-linked and can withstand high temperatures). In aluminum/polymer multilayer composites where the bulk material is reduced to powder for propellant and explosive applications (see U.S. Pat. No. 5,912,069), the aluminum is kept in unoxidized form until used in order to enhance the exothermic reaction that takes place when it is reacted with an oxidizing agent.

Similarly, in applications where the multilayer structure is reduced to single-layer aluminum flakes (e.g., Ser. No. 10/355,373 and U.S. Pat. No. 6,398,999), in order to avoid an explosion, the aluminum is kept in the same solvent used to dissolve the organic layer until it is incorporated into a binder for further use. Because the solvents typically used for pigment applications (such as acetone, toluene, and ethyl acetates) contain some amount of water and dissolved air that produce hydrated oxides in the flake-material film, over time this causes noticeable deterioration in the integrity of the flakes. If solvents that contain larger quantities of water are used (like isopropyl alcohol), the highly exothermic reaction of aluminum with water causes a rapid corrosion of the nano-flake, with the possibility of even causing an explosion.

The invention is based on an understanding of the mechanisms that produce the deterioration of the properties of flakes manufactured by sequential vacuum deposition of organic and metallic flake-precursor materials, as described above. One problem lies in the fact that the organic release material must remain extractable (either by dissolution or by melting) after the vacuum deposition process. Therefore, it has not been cured to harden it after condensation and consequently the subsequent vacuum deposition of the flake-precursor material has been carried out over a relatively soft release layer. Both Ser. No. 10/355,373 and U.S. Pat. No. 6,398,999 describe the use of polymeric release materials that are evaporated and re-deposited in vacuum as solid polymers, but that are not further cured after deposition.

This produces a rough surface in the release layer and a corresponding micro-roughness and wrinkles in the metal film deposited over it that yield uneven, wrinkled, flakes when the film is crushed to separate the flake product. In the case of aluminum pigment, this problem greatly reduces the reflective properties of the flake in the visible spectrum. These less-than-perfectly-flat flakes do not reflect light as uniformly as flat flakes would (or are not as transparent, in the case of ITO and IZO), which reduces the efficacy of the process to produce high-quality reflective (or transparent) flakes. Similarly, since wrinkled flakes do not extend laterally as much as flat flakes of equal surface would, the physical contact between adjacent flakes and the conductivity of the film resulting from their agglomeration is also reduced.

Conventional organic release materials melt at temperatures of the order of 80 C-150 C. Therefore, after they are vacuum deposited on a rotating drum, the heat produced by the subsequent deposition of a metal film can soften and wrinkle the surface of the organic layer. This is particularly obvious when the condensation drum is rotating at high speeds and there is little time between condensation and exposure to the heat produced by the immediately following metal deposition source. At high drum speeds the surface of the organic material does not have time to reach equilibrium with the cold drum before it is re-heated by the metallic deposit. Thus, although the heat is not sufficient to re-melt the organic layer, its surface can wrinkle and, for example, reduce the reflectivity of a deposited aluminum layer in the visible spectrum. Note that the same problem is not as significant in the infrared (IR) spectrum because IR reflection can remain specular (micron-size roughness does not affect radiation with wavelength of 2-15 µm). The term specular is used herein, as in optics, to refer to a surface having mirror-like reflection in which light from a single incoming direction is reflected onto a single outgoing direction, as described by the law of reflection.

The specularity of a deposited aluminum layer could be increased by depositing a cross-linked polymer layer on the dissolvable organic layer, thus eliminating the effect of heat on the dissolvable substrate. (See A. Yializis et al., "Low Emissivity Polymer-Metal Pigments and Coatings," 1997 Meeting of The IRIS Group On Camouflage Concealment and Deception, Volume 1, October 1997. In such a case, though, the thicker composite flake would necessarily incorporate a cross-linked polymer layer that is difficult to process for many ink and paint applications and that, therefore, would have limited applications. Therefore, this approach is not desirable for reflective and conductive inks and pigments.

Particularly with respect to aluminum pigment flakes, another problem lies in the presence of moisture at each of the various steps leading to the final pigment product. Most notably, the solvents in which the release layers are usually dissolved to separate them from the aluminum material (organic solvents such as acetone, toluene, and ethyl acetates) contain some amount of water. This leads to the formation of corrosion in the aluminum film (mostly in the form of hydrated oxides), which over time produces noticeable deterioration in the integrity of the flakes. As a result, the reflectivity and brightness of the pigments decrease noticeably and soon to levels that are commercially unacceptable.

Therefore, according to one aspect of the present invention, a different kind of release material is used, namely one that can be hardened at a thin surface layer while maintaining its extractability. Such a release agent is flash-evaporated and condensed under conventional vacuum-deposition conditions. Then, prior to deposition of the metallic flake-precursor material, the surface of the release film is treated with a plasma source (operating in DC or RF) or an ion beam (with ions or neutral particles) in order to produce a very thin layer of flat and smoothed hardened surface for receiving the subsequent deposition of flake-precursor material. The degree of such surface treatment is controlled to obtain the hardened surface without affecting the extractability of the release layer, as this term is herein defined.

As a result of this surface treatment, the flakes obtained after crushing the flake-precursor film and extracting the release material are much flatter and shinier (or more transparent, as applicable) than flakes produced without the surface treatment. The conductivity of inks and paints incorporating such flakes is similarly improved. Thus, by judiciously controlling the surface treatment of the release layer, the flatness and the corresponding optical and electrical properties of the flakes are optimized.

According to another aspect of the invention applicable particularly to the manufacture of aluminum pigment, the vacuum deposition of the aluminum film is both preceded and followed by exposure to a plasma or ion-beam gas containing a passivating component such as oxygen or nitrogen. It is known that in a plasma or ion-beam gas a small percentage of the gas is ionized. Therefore, the presence of molecular oxygen produces an activated layer of neutral, ionized and atomic oxygen that passivates the surface of the aluminum layer. (The same applies to nitrogen when the gas is used to protect the underlying metal by the formation of a nitride, rather than an oxide.) In the presence of organic material, such activated species in the reactive gas plasma produce functional groups, such as carboxyl, hydroxyl and nitrile groups, that also react with the aluminum and passivate the surface in contact with the organic coating. Thus, this treatment produces the immediate formation of a protective aluminum-oxide (or nitride) layer that prevents the subsequent deterioration of the film caused by exposure to environmental moisture. As a result, the aluminum flakes manufactured by the process of the invention retain their reflectivity and gloss over time, thereby allowing the full practical realization of the advantages provided by the surface treatment of the release layer.

According to yet another aspect of the invention, the hardening of the release-layer surface and the passivation of the underside of the subsequently deposited aluminum film may be performed with the same plasma or ion-beam unit simply by using a gas containing the passivating component under conditions designed to promote the formation of highly reactive, ionized and activated species that produce the rapid oxidation of the metal film along with the cross-linking of the release layer. That is, the aluminum layer is deposited on a release-layer surface that is not only hardened but is also rich with oxygen-based (or nitrogen-based) functional groups that cause the underside of the deposited aluminum layer to also oxidize and be passivated prior to exposure to moisture.

According to one embodiment of the invention, the concurrent vacuum deposition of the release layer and flake material is carried out continuously on a rotating drum, thereby producing a continuous spiral of arbitrary length. This allows the continuous in-line production of a large bulk volume of flake-material film embedded between release-material layers, which in turn yields extensive quantities of flakes by crushing the layered product and heating or dissolving the release material.

In another embodiment, the process is carried out in a vacuum chamber containing a second unit for the deposition of release material at the tail end of the sequential stages. In such a case, instead of depositing continuously on a rotating drum, the process is carried out by depositing sequentially a layer of release material and of flake material on a web moving between spools in one direction, and then by depositing another layer of release material and flake material while the web is moved in the opposite direction, thereby forming a multilayer structure of alternating release and flake materials on the web. Alternatively, after the deposition of the initial release layer, the process is carried out by depositing sequentially a layer of flake material and release layer on the web moving between the spools in one direction, and then by depositing again flake material and release material while the web is moving in the opposite direction. In this case, each deposited layer of release material has enough time to fully cool down and solidify on the spool before another aluminum layer is deposited over it when the web is re-spooled in the opposite direction. In either case, the procedure is continued at will until the desired number of layers is obtained.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1:
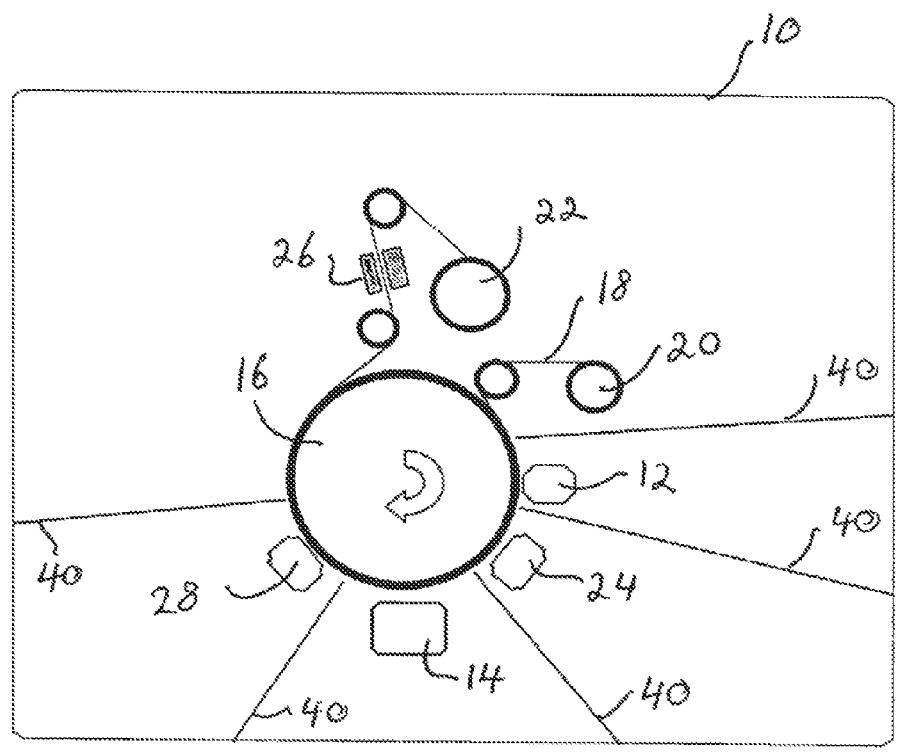
FIG. 1 is a schematic representation of a modified vacuum chamber according to the invention wherein the release material and the metallic film are deposited over a rotating drum.

The invention is grounded on the idea of treating the surface of a vacuum deposited organic release layer to harden it by cross-linking the surface in its flat deposited form, and vacuum depositing a metallic flake-material precursor over the resulting hardened flat surface of release layer in a continuous process to produce a bulk layered structure from which flakes can be manufactured in large quantity. Particularly in the case of metals that can benefit by the formation of a protective oxide (or nitride), like aluminum, the invention also involves treating both sides of the deposited metallic film with a passivating gas.

For the purposes of this disclosure, metallic materials are defined as including metals as well as metal oxides, such as ITO and IZO. The term flake refers to a particle of substantially uniform thickness and having an irregular planar shape with a nominal diameter at least one order of magnitude greater than the thickness. The terms nominal diameter and diameter are used interchangeably with respect to a flake to represent the diameter of a circular shape having the same surface area as the planar side of the flake. The term wrinkled is used with reference to flakes to mean containing planar irregularity or surface roughness (i.e., wrinkled means not flat). The above notwithstanding, it is understood that the flake-precursor film deposited on a drum or a rolled web necessarily has some degree of curvature. Since such curvature is almost imperceptible in a particle with the size of a flake, though, it is not considered a wrinkle for the purposes of this definition. The terms flake material, flake precursor, flake-precursor material and the like are used interchangeably to refer to any material which may be deposited according to the invention to produce a film intended to be crushed to yield flakes.

The terms organic material, organic layer and release material are used interchangeably to refer to any substance conventionally used in the art to isolate interleaved layers of metallic flake-precursor material in a composite structure that allows the subsequent separation of the flake precursor from the release material, either by melting or dissolving the release material in a solvent. The terms extraction and extractable are used in this disclosure with reference to organic materials to mean that they can be separated from a multilayered metallic/organic structure either by melting (fusible) or dissolution (soluble), or both. That is, an extractable release layer is one wherein the degree of cross-linking introduced by the surface treatment of the invention is not sufficient to prevent the subsequent dissolution or melting of the release layer to extract it from the multilayer structure produced by vacuum deposition.

The term oligomer is used herein to refer not only to molecular chains normally designated as such in the art (typically containing between two and ten monomer molecules) but also to low-molecular weight polymers; specifically, oligomer is meant to encompass any polymerized molecule having a molecular weight sufficiently low to permit its vaporization under vacuum at a temperature lower than its temperature of thermal decomposition. The term polymerizable is used to indicate the ability of a monomer molecule with a single carbon-to-carbon double bond (monofunctional monomer) to bind with itself to form a longer polymeric chain. The terms cross-linking and cross-linkable are used to indicate the ability of an organic molecule to randomly bind with other molecules of the same or another material. The term curing is used in general to refer to the process of solidifying the entire thickness of a layer of organic material either by polymerization or cross-linking, or both. For the purposes of the present invention, however, curing refers to the process of solidifying the entire thickness of a layer of organic material only by polymerization and suitable organic materials are judiciously selected with that in mind in order to maintain the extractability of the layer.

The term wax is used in conventional manner to refer to any of various natural, oily or greasy, heat-sensitive substances consisting of hydrocarbons or esters of fatty acids that are insoluble in water but soluble in organic solvents. Inasmuch as the invention pertains in the same way to both pigments and inks, when the term pigment alone is used, it is intended to refer to both pigments and inks unless otherwise specified.

The term condensation refers to a phase-change process from gas to liquid (and subsequently solid) obtained upon contact with a surface having a temperature lower than the dew point of the gas at a given operating pressure. The term surface treatment is used to refer to the effect of a plasma source or an ion beam to cause superficial cross-linking of an organic layer under conditions that prevent it from becoming non-extractable. The term surface passivation is used to refer to the formation of a protective oxide or nitride layer on the surface of the metallic layer freshly deposited by the process of the invention. Such passivation is produced, without limitation, by a plasma source or ion beam operated in the presence of molecular oxygen and/or nitrogen to produce an activated layer of molecular, ionized and atomic particles that passivate the surface of the metal layer being treated, particularly aluminum, by the formation of superficial oxides and/or nitrides.

As those skilled in the art would readily appreciate, plasma sources may involve electrons, UV radiation, ions, free radicals and neutral species, and ion beams may contain ions and/or neutral gas species that can be used to produce both surface treatment and passivation in varying degrees, depending on gas composition and operating conditions.

The term organic deposition is used to refer to conventional flash-evaporation followed by condensation in a vacuum deposition process and/or apparatus for deposition an organic material. Flash-evaporation, as contrasted to generic evaporation, is used to refer to a process wherein an organic material is evaporated almost instantaneously as a result of flow in fluid form over a hot evaporator, rather than by heating the material in bulk form. Finally, the term inorganic deposition is used to refer to any conventional vacuum deposition process and/or apparatus for deposition a metal, dielectric, or other inorganic material, such as by resistive evaporation, sputtering, and reactive evaporation, as appropriate for a particular material.

As described, the invention is practiced by depositing a thin film of metallic flake-precursor material over an organic release layer that has been treated to harden its surface by cross-linking without affecting its bulk extractability, so that it can be subsequently separated from the flake material. The organic materials may be solid at room temperature, such as waxes or oligomers, that can be melted, flash-evaporated, and re-condensed as solids on a substrate. They may also be liquid, such as monofunctional monomers or oligomers that can be flash-evaporated directly, condensed as liquid layers on a substrate, and then polymerized (cured without cross-linking) to form a still dissolvable (extractable) organic material on a web or a rotating drum.

The release material may consists of a non-polymeric substance (such as waxes and organic small molecules with molecular weight between 200 and 5,000—e.g., anthracene, anthraquinon, phthalic acid, phthalic anhydride, triphenyl methane), or a polymeric substance (such as polystyrene, polycycloaliphatic, polyfluorocarbon and polyethylene oligomers). The release material may also consist of monofunctional monomers or oligomers that polymerize and produce a linear thermoplastic material (e.g., acrylates and vinyls). The release material must be such that it can be flash-evaporated and vacuum deposited to form an extractable (soluble and/or fusible) release layer appropriate for the subsequent manufacture of flakes.

The surface treatment of the organic release material with a plasma source or ion beam produces superficial cross-linking of a very thin surface layer (which should not exceed 10 percent—preferably 5 percent—of the total thickness of the release layer), so as to retain the extractability of the release material. We found that such surface cross-linking of paraffin wax, for example, can be so limited by exposure to a conventional plasma source for less that 1 second.

In order to practice the invention, a conventional vacuum chamber 10 is used with an organic deposition station 12 and an inorganic deposition station 14 operating sequentially to enable the concurrent deposition of the release material and the flake precursor, as illustrated schematically in FIG. 1. The release material is melted, if necessary, injected into the evaporation section of the organic deposition station (the evaporator, not shown in the figure), and flash-evaporated upon contact with a hot surface.

The flash-evaporation step is critical in producing a coating that has a uniform thickness during long deposition runs that may last several hours. The process is started by injecting the liquid organic material into an empty evaporator under accurately controlled conditions to produce the desired thickness in the release layer. At any point in time, only a small quantity of material is allowed into the evaporator for continuous flash-evaporation of the material in fluid form. Under these fast-processing conditions, the organic material is relatively insensitive to temperature as long as the temperature is high enough to flash-evaporate it. This is in contrast to conventional evaporation processes where the evaporator is filled with organic material and the thickness of the deposited layer is a function of evaporator temperature, which can vary over time (especially as the organic material is consumed) and produce correspondingly varying thicknesses in the deposited layer.

The vapor of release material resulting from flash-evaporation according to the invention is then passed through a slit to reach the condensation section of the organic deposition station 12 in the vacuum chamber. Upon contact with a rotating cold drum 16 (typically kept at −20° C. to 30° C.), the vapor condenses and forms a uniform, homogeneous thin film that quickly solidifies. As in prior-art organic deposition units, the thin film may be deposited to produce a film coating directly over the drum 16 or over a continuously fed web substrate 18 in contact with the drum and spooled between a feed reel 20 and a take-up reel 22 (as illustrated).

According to the present invention, the film of release material so deposited is immediately treated in-line in order to cross-link and harden its surface by exposure to a surface treatment station 24. This may be a conventional DC or RF plasma source or an ion beam. This treatment produces sufficient cross-linking and hardening of the most superficial layer of the release film in its flat deposited condition to ensure that the flake material is subsequently deposited over a uniformly flat substrate. We found that exposure of waxes or low molecular-weight organic molecules to such conventional surface treatment for less than one second is sufficient to harden the surface as required to produce flat flakes while retaining the extractability of the release material.

As shown in FIG. 1, a metallic flake-precursor material is vacuum deposited over the treated release layer in the inorganic deposition station 14 (such as a resistive evaporation unit, a dual-magnetron sputtering unit, or an electron-beam evaporation unit, as applicable as a function of the metallic material being deposited). The metallic layer is preferably deposited in a thickness in the order of one hundred angstroms over a release layer of sub-micron thickness. For example, 75-300 angstroms of aluminum or up to 1,000 angstroms of ITO would be resistively evaporated or sputtered, respectively, over a 0.05-0.5 micron thick release layer. Therefore, the relative deposition rates need to be adjusted to produce the desired thickness of the respective layers. If the process is carried out continuously on a rotating drum, the concurrent deposition of release material and flake precursor produces a continuous spiral of concentric layers of release and precursor materials.

In order to ensure the uniform deposition of the vaporized metallic material over the release layer, it is critical that the deposition rate of the station 14 be controlled precisely. Therefore, the web 18 spooled between the feed reel 20 and the take-up reel 22 may be advantageously utilized in conjunction with an optical densitometer 26 to set the correct deposition rate even when the material is intended to be ultimately deposited on the rotating drum 16. The release and metallic layers are first deposited over a web 20 moving from reel to reel and the metal deposition rate is adjusted using the densitometer 26 to monitor the thickness of the deposited metal layer. When the desired thickness is achieved, the web 20 is cut without interrupting the operation and the deposition is continued over the rotating drum 16 to produce the multilayer release/metallic structure.

According to another aspect of the present invention pertaining particularly to the production of aluminum flakes, the deposited aluminum film is passivated in-line in the vacuum chamber to prevent subsequent interaction with ambient moisture, which is now known to produce corrosion and deterioration of the flake's physical characteristics. This is achieved by exposing the top surface of the deposited aluminum film to another surface treatment station 28 operated with a reactive gas (used to passivate) in sequence past the inorganic deposition station 14. The station 28 may again be a plasma source or an ion-beam unit operating with a gas containing a passivating component, such as oxygen and/or nitrogen. As explained above, this treatment produces a superficial layer of oxide and/or nitride (depending on the plasma gas used) that inhibits the formation of undesirable hydrated compounds when the material is subsequently exposed to moisture.

At the same time, in order to also passivate the bottom layer of the aluminum layer, the hardening of the release-layer surface performed in the surface treatment station 24 is also carried out with reactive plasma or an ion-beam gas containing a passivating component. Thus, the aluminum film is then deposited on a release-layer surface that is rich with oxygen-based (or nitrogen-based) functional groups that passivate also the underside of the aluminum layer while it is being deposited. As a result, the aluminum flakes obtained by the process of the invention retain indefinitely their reflectivity and brightness.

Upon separation from the drum, the release/flake-material layers are processed in conventional manner to separate the metallic layers from the composite structure. This may be accomplished by mechanical peel off, by melting the release material, or by dissolving it in an organic solvent. Preferably, the bulk product of deposition is crushed to yield multilayer particles of a desired size. These are then further reduced to smaller particles that eventually produce single flakes in a suitable solvent that is also used to extract the release material from the flakes. Typically, this process yields high-aspect, flat flakes about 5-20 μm in nominal diameter and up to 0.1 μm in thickness that are particularly high in reflective, transparency, or conductivity, depending on the metallic material.

It is clear that the process of the invention could be carried out in equivalent fashion using the web 18 over which the release material and the flake material are deposited, in that order, in the vacuum chamber 10. As illustrated in FIG. 1, in such a case the web 18 is run continuously in contact with the cold surface of the drum 16, and the materials are deposited over the web as it progresses from the feed reel 20 to the take-up reel 22. Thus, a two-layer deposit is obtained (a metallic film and a layer of release material over the web), producing a spiral product that can be separated from the web and treated, as explained above, to obtain flakes.

Figure 2:
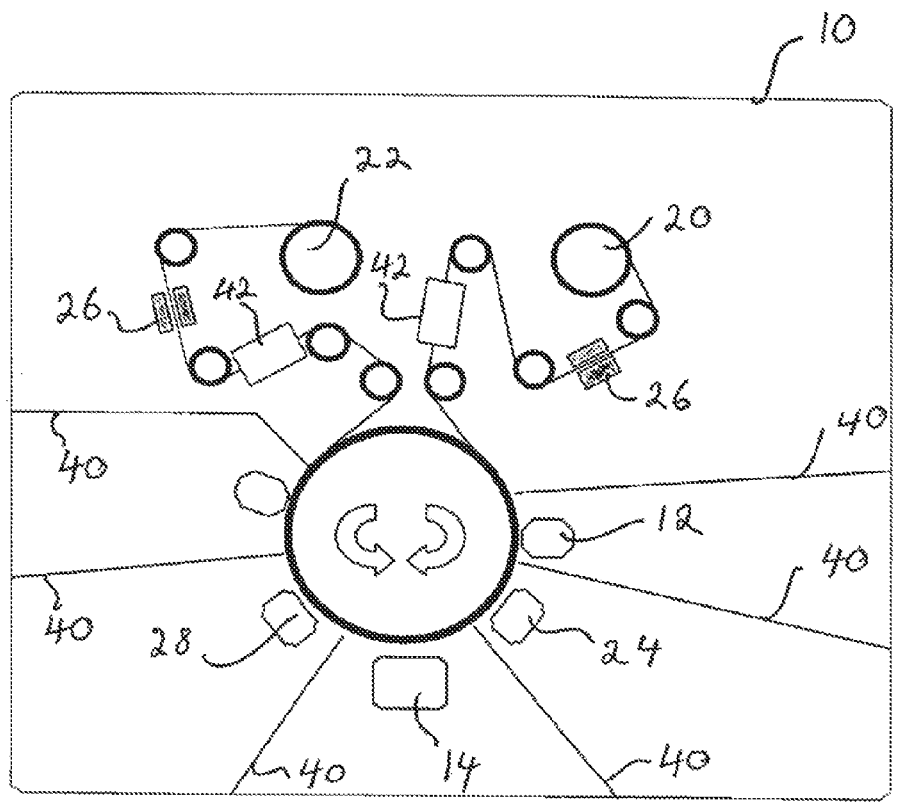
FIG. 2 is a schematic representation of the vacuum chamber according to the invention wherein the release material and the metallic film are deposited over a web spooled back and forth

In a different implementation of the invention conducted over a web 18, a vacuum chamber 30 is fitted with an additional organic-deposition station 32 in-line past the second surface treatment (passivation) station 28, as shown in FIG. 2. As a result of this configuration, the web 18 may be sequentially passed through an organic-deposition station, a surface treatment station, an inorganic deposition unit, another surface treatment station, and another organic-deposition station regardless of the direction of motion of the web. The first and second organic-deposition stations are operated alternately between passes in opposite direction, while the inorganic deposition and surface treatment stations area always active. Operating in this manner, a multilayer structure can be built more rapidly over the web by depositing a layer of release material and film of flake precursor at each pass. The second in-line organic-deposition station is preferably operated during each pass (rather than the first in-line station) in order to allow more time for the deposited organic layer to cool down and solidify while resting in the reel before being re-spooled in the opposite direction. The rest of the conditions remain the same, as detailed above.

Figure 3:
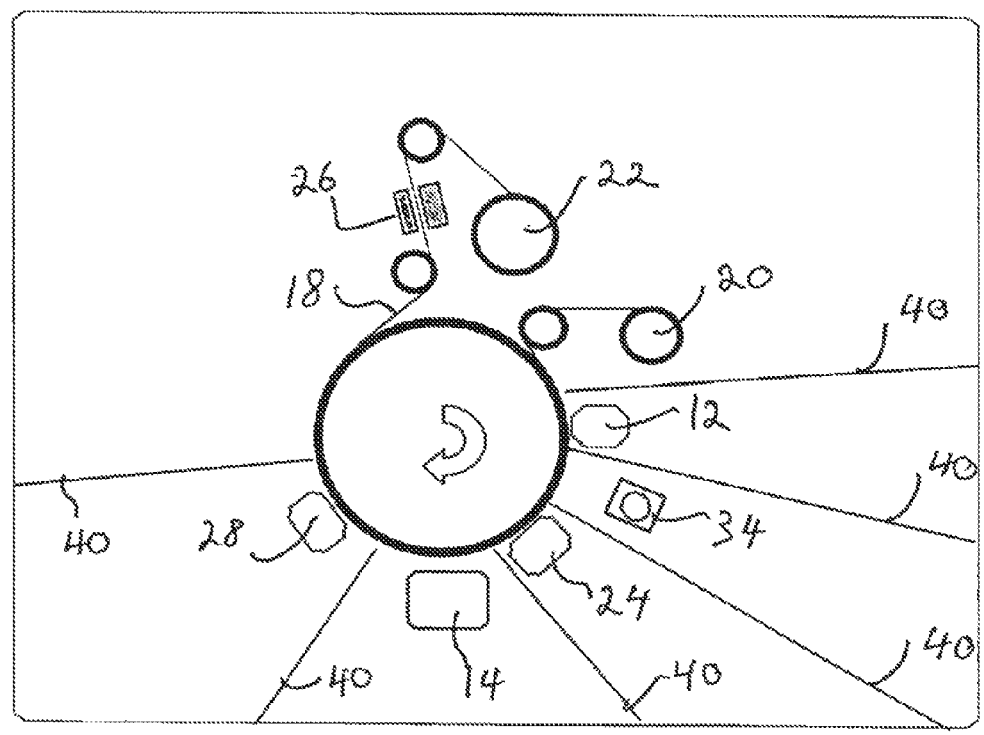
FIG. 3 is a schematic representation of a vacuum chamber as in FIG. 1 with the addition of a curing station between the organic deposition station and the first surface treatment station.
Figure 4:
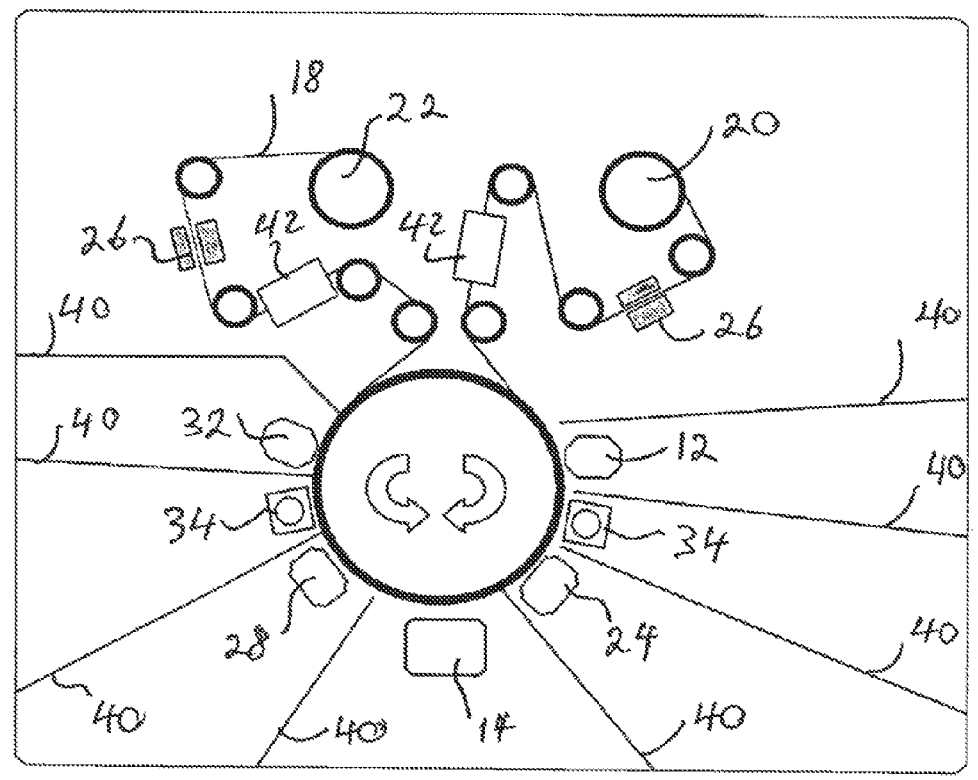
FIG. 4 is a schematic representation of a vacuum chamber as in FIG. 2 with the addition of a first curing station between the first organic deposition station and the first surface treatment station, and the addition of another curing station between the second organic deposition station and the second surface treatment station.

When a polymerizable release layer is used as mentioned above (for example, a monofunctional monomer or oligomer), it needs to be cured prior to the surface treatment step. Accordingly, a curing unit is used ahead of the surface treatment station (such as a conventionally operated electron beam or UV radiation unit). FIGS. 3 and 4 illustrate vacuum chambers that include such curing units 34. The chambers are otherwise operated as described above.

The following examples illustrate the invention. The materials selected for these examples were non-polymeric waxes and low molecular-weight organic release agents known to exhibit very low adhesion to substrate films and other coatings (such as metals or metal oxides); polymeric oligomers (e.g., polyethylene, polystyrene, polybicycloaliphatic, polyvinylidene fluoride); and monofunctional monomers and oligomers that polymerize to produce linear thermoplastic materials.

All examples were carried out in the same vacuum chamber at a maximum vacuum of about $10^{-4}$ torr, as indicated below. As those skilled in the art will readily appreciate, however, this pressure applies only to the inorganic deposition station, which is in the highest vacuum zone. As illustrated in the figures, each function is preferably carried out in a separate zone isolated from the other zones by partitions 40 in the vacuum chamber. For instance, the organic deposition stations 12, 32 may be operated at any pressure less than 1 torr; the surface treatment stations 24, 28 at $10^{-1}$ to $10^{-3}$ torr; the curing units 34 at $10^{-3}$ to $10^{-4}$ torr; and the feed and take-up sections are normally kept at at $10^{-1}$ to $10^{-3}$ torr. The pressure (vacuum) in each zone is regulated by a combination of the action of vacuum pumps and the release of material in the section, which contributes to reducing vacuum.

Example 1

Non-Polymeric Release Material

A paraffin wax from Aldrich Chemical Company of Milwaukee, Wis., was melted at 80° C. and injected into a $10^{-3}$ to $10^{-6}$ torr vacuum chamber (operated at about $10^{-4}$ torr) to be flash-evaporated at about 300° C. The formed vapor, driven by vacuum, was passed through a slit nozzle from the evaporating area to a deposition chamber and deposited as a solid coating about 0.05-0.10 micron thick on a cold drum kept at about 0° C. The wax film was immediately exposed to a plasma gas of composition 80% Ar, 20% $O_2$. An aluminum film about 100 Å thick was resistively evaporated in-line on top of the treated release coating. The speed of the rotating drum was limited to about 100 linear meters per minute. Finally, the film of aluminum was exposed to a plasma produced with a plasma gas of composition 80% Ar, 20% $O_2$. A multilayer sequential aluminum/release strap (about 5,000 layers) was formed. After deposition, aluminum flakes were produced by crushing the deposited material and then dissolving and extracting the release layers in toluene. The resulting flakes were about 100 Å thick, about 10 μm in nominal diameter, and optically flat, shiny and highly reflective.

The aluminum flakes so produced still exhibited a high reflectivity in visible light and high corrosion resistance, as indicated by maintaining their original specular reflectivity after a period of 10 months after exposure to solvents and air, and thereafter. Aluminum flakes prepared without surface hardening and passivation are less reflective and turn darker during the solvent extraction process.

Example 2

Non-Polymeric

A non-polymeric carnauba wax from Aldrich Chemical Company of Milwaukee, Wis., was used as the release material in the vacuum chamber under the same conditions of Example 1, except that it was melted at 120° C. and flash-evaporated at about 320° C. The resulting aluminum flakes were the same in size, flat, and reflective as in Example 1. Though exposed to air and moisture, they retained their highly specular reflectivity several months after manufacture, and thereafter.

Example 3

Non-Polymeric Small Organic Molecule

Anthracene was used as the release material in the vacuum chamber under the same conditions of Example 1, except that it was melted at 220° C. and flash-evaporated at about 300° C. The resulting aluminum flakes were the same in size, flat, shiny and reflective as in Example 1. Exposed to air and moisture, they continued to retain their highly specular reflectivity six months after manufacture.

Example 4

Non-Polymeric Wax

A paraffin wax was used as the release material in the vacuum chamber under the same conditions of Example 1, except that the aluminum was deposited in thicknesses of about 75 and 200 angstroms in separate runs. The resulting aluminum flakes were approximately 75 and 200 angstrom thick, respectively, about 10 μm in nominal diameter, and optically flat, and reflective. Exposed to air and moisture, they continued to retain their specular reflectivity six months after manufacture.

Example 5

Non-Polymeric Small Organic Molecule

Triphenylmethane was used as the release material in the vacuum chamber under the same conditions of Example 1, except that release material was melted at 95° C. and flash-evaporated at about 250° C. The resulting aluminum flakes were approximately 100 angstrom thick, about 10 μm in nominal diameter, and optically flat, shiny and reflective. Exposed to air and moisture, they continued to retain their high reflectivity over six months after manufacture. Several other aromatic compound (anthraquinone, phthalic acid, phthalic anhydride, triphenylene and benzimidazole) were also tested to manufacture aluminum flakes and produced with similar results.

Example 6

Polymeric Oligomer

A polyethylene oligomer of molecular weight 4000 (from Aldrich Chemical Company of Milwaukee, Wis.) was melted at 130° C. and injected into a $10^{-3}$ to $10^{-6}$ torr vacuum chamber (operated at about $10^{-4}$ torr) to be flash-evaporated at about 300° C. The formed vapor, driven by vacuum, was passed through a slit nozzle from the evaporating area to a deposition chamber and deposited as a solid coating about 0.05-0.10 micron thick on a cold drum kept at about 0° C. The release film was immediately exposed to a plasma gas of composition 80% Ar, 20% $O_2$. An aluminum film about 100 Å thick was deposited by resistive evaporation in-line on top of the treated release coating. The speed of the rotating drum was limited to about 100 linear meters per minute. Finally, the film of aluminum was exposed to a plasma field produced with a plasma gas of composition (80% Ar, 20% $O_2$). A multilayer sequential aluminum/release strap (about 5,000 layers) was formed. After deposition, aluminum flakes were produced by crushing the deposited material and then dissolving and extracting the release layers in toluene. The resulting flakes were about 100 Å thick, about 10 μm in nominal diameter, and optically flat, shiny and highly reflective. Exposed to air and moisture, they retained their specular reflectivity 10 months after manufacture and thereafter.

Example 7

Polymeric Oligomer

A polystyrene oligomer (molecular weight 800-1200) from Aldrich Chemical Company of Milwaukee, Wis., was used as the release material in the vacuum chamber under the same conditions of Example 6, except that it was melted at 200° C. and flash-evaporated at about 350° C. The resulting aluminum flakes were the same in size, flat, shiny and reflective as in Example 1. Exposed to air and moisture, they continued to retain their high reflectivity 10 months after manufacture.

Example 8

Polymeric Oligomer

A poly(α-methylstyrene) oligomer (MW 1400) from Aldrich Chemical Company of Milwaukee, Wis., was used as the release material in the vacuum chamber, under the same conditions of Example 6, except that it was melted at 180° C. and flash-evaporated at about 350° C. The resulting aluminum flakes were the same in size, flat, shiny and reflective as in Example 1. Exposed to air and moisture, they continued to retain their high specularity 10 months after manufacture.

Example 9

Polymeric Oligomer

Poly(bicycloaliphatic) oligomers (MW 1200) from Kowa American Corporation and San Esters Corporation were used as the release material in the vacuum chamber under the same conditions of Example 6, except that it was melted at 150° C. and flash-evaporated at about 300° C. The resulting aluminum flakes were the same in size, flat, shiny and reflective as in Example 1. Exposed to air and moisture, they continued to retain their high specularity 10 months after manufacture.

Example 10

Monofunctional Polymerizable Monomer

Liquid isobornyl methacrylate monomer from Sartomer Company was injected directly into a $10^{-3}$ to $10^{-6}$ torr vacuum chamber (operated at about $10^{-4}$ torr) to be flash-evaporated at about 220° C. The formed vapor, driven by vacuum, was passed through a slit nozzle from the evaporating area to a deposition chamber and deposited as a liquid coating about 0.05-0.10 micron thick on a cold drum kept at about 0° C. The film was cured by exposure to an electron gun operating at 10 KV and 100 mA and then treated to smooth its surface with a plasma gas of composition 80% Ar, 20% $O_2$. An aluminum film about 100 Å thick was resistively evaporated in-line on top of the treated release coating. The speed of the rotating drum was kept at about 100 linear meters per minute. Finally, the film of aluminum was exposed to a plasma field produced with a plasma gas of composition 80% Ar, 20% $O_2$. A multilayer sequential aluminum/release strap (about 5,000 layers) was formed. After deposition, aluminum flakes were produced by crushing the deposited material and then dissolving and extracting the release layers in ethyl acetate. The resulting flakes were about 100 Å thick, about 10 μm in nominal diameter, and optically flat, shiny and highly reflective. Exposed to air and moisture, they continued to retain their high reflectivity 6 months after manufacture.

Example 11

Monofunctional Polymerizable Monomer

Liquid stearyl acrylate monomer from Sartomer Company was used as the release material in the vacuum chamber under the same conditions of Example 10 above, except that it was flash-evaporated at about 240° C. The resulting aluminum flakes were the same in size, flat, shiny and reflective as in Example 1. Exposed to air and moisture, they continued to retain their high reflectivity 6 months after manufacture.

The aluminum flakes so produced were compared to flakes produced by the method described in Example 1 of Ser. No. 10/355,373 (essentially the same, except that the polymeric release agent was not treated and the aluminum film was not passivated). Table 1 below shows the difference in the results obtained from the two processes (referred to as Prior Art and Invention). Reflectivity was measured using a VIS/IR spectrophotometer. Both measurements were conducted on the film obtained after conventional mixing of the flakes produced from Examples 1, 5, 9 and 10 in a binder and application as a paint.

TABLE 1

| | REFLECTION, % | |
|---|---|---|
| | PRIOR ART | INVENTION |
| Example 1 | 55 | 93 |
| Example 5 | 65 | 92 |
| Example 9 | 60 | 95 |
| Example 10 | 50 | 92 |

The following examples relate to metallic conductive materials.

Example 12

Non-Polymeric Wax

A paraffin wax from Aldrich Chemical Company of Milwaukee, Wis., was melted at 80° C. and injected into a $10^{-3}$ to $10^{-6}$ torr vacuum chamber (operated at about $10^{-4}$ torr) to be flash-evaporated at about 300° C. The vapor was deposited as a solid coating about 0.05-0.10 micron thick on a cold drum kept at about 0° C. The wax film was immediately exposed to Ar/O2 plasma. A silver film about 300 Å thick was resistively evaporated in-line on top of the treated release coating. The speed of the rotating drum was limited to about 100 linear meters per minute. A multilayer sequential silver/release strap (about 3000 layers) was formed. After deposition, silver flakes were produced by crushing the deposited material and then dissolving and extracting the release layers in toluene. The resulting flakes were about 300 Å thick, about 10 μm in nominal diameter, and optically flat, shiny and conductive.

Example 13

Non-Polymeric Wax

A carnouba wax from Aldrich Chemical Company of Milwaukee, Wis., was used as the release material in the vacuum chamber under the same conditions of Example 2, except that the organic material was melted at 120° C. and flash-evaporated at about 320° C., and copper was deposited in a 300 Å thick film. The resulting copper flakes were the same in size, flat, shiny and conductive Example 14

Non-Polymeric Small Organic Molecule

Anthracene was used as the release material in the vacuum chamber under the same conditions of Example 12, except that it was melted at 220° C. and flash-evaporated at about 300° C., and silver was deposited in a 300 Å thick film. The resulting silver flakes were the same in size, flat, shiny and conductive.

Example 15

Non-Polymeric Wax

A paraffin wax was used as the release material in the vacuum chamber under the same conditions of Example 1 except that chromium was deposited in a 200 Å thick film. The resulting chromium flakes were optically flat, shiny and conductive.

Example 16

Polymeric Oligomer

A polyethylene oligomer of molecular weight 4000 (from Aldrich Chemical Company of Milwaukee, Wis.) was melted at 130° C. and injected into a $10^{-3}$ to $10^{-6}$ torr vacuum chamber (operated at about $10^{-4}$ torr) to be flash evaporated at about 300° C. The vapor was deposited as a solid coating about 0.05-0.10 micron thick on a cold drum kept at about 0° C. A silver film about 300 Å thick was deposited by resistive evaporation in-line on top of the treated release coating. The resulting silver flakes were optically flat, shiny and highly conductive.

Example 17

Monofunctional Polymerizable Monomer

Liquid isobornylacrylate monomer from Sartomer Company was injected directly into a $10^{-3}$ to $10^{-6}$ torr vacuum chamber (operated at about $10^{-4}$ torr) to be flash-evaporated at about 220° C. The vapor was deposited as a liquid coating about 0.05-0.10 micron thick on a cold drum kept at about 0° C. The film was cured by exposure to an electron gun operating at 10 KV and 100 mA and then treated to smooth its surface with a plasma gas of composition 80% Ar, 20% O$_2$. A silver film about 300 Å thick was resistively evaporated in-line on top of the treated release coating. A multilayer sequential copper/release strap (about 3000 layers) was formed from which copper flakes were extracted with ethyl acetate.

The silver and copper flakes so produced were compared to comparable flakes produced by the method described in Ser. No. 10/355,373 (essentially the same, except that the polymeric release agent was not treated as disclosed herein). Table 2 below shows the difference in the conductivity of the products made with flakes obtained from the two processes (referred to as Prior Art and Invention). Surface resistance (as a function of conductivity) was measured using a four-point probe. All measurements were made on the film obtained after conventional mixing of the flakes in a binder and application as paint.

TABLE 2

| (surface resistance, ohm/sq) | | |
|---|---|---|
| | PRIOR ART | INVENTION |
| Example 12 | 5 | 1 |
| Example 13 | 3 | 0.5 |
| Example 16 | 7 | 0.5 |
| Example 17 | 5 | 0.5 |

The following examples relate to transparent conductive materials.

Example 18

Non-Polymeric Wax

A paraffin wax from Aldrich Chemical Company of Milwaukee, Wis., was melted at 80° C. and injected into a 10$^{-3}$ to 10$^{-6}$ torr vacuum chamber (operated at about 10$^{-4}$ torr) to be flash-evaporated at about 300° C. The vapor was deposited as a solid coating about 0.05-0.10 micron thick on a cold drum kept at about 0° C. The wax film was immediately exposed to Ar/O$_2$ plasma. An ITO film about 500 Å thick was sputtered in-line on top of the organic release coating. The speed of the rotating drum was limited to about 5 linear meters per minute by the ability to sputter ITO, which is significantly slower than the normal rate of vapor deposition of release material. A multilayer sequential ITO/release-coating strap (about 2,000 layers) was formed. After deposition, ITO flakes were produced by crushing the deposited material and then dissolving the release layers in toluene. The resulting flakes were about 500 Å thick, about 10 μm in nominal diameter, clear and conductive.

Example 19

Polymeric Oligomer

A poly(α-methylstyrene) oligomer of molecular weight 1300 (Aldrich Chemicals) was melted at 150° C., injected into evaporator and evaporated as in Example 18 above. The solid layer was treated and an ITO film was deposited as in that example. The resulting flakes were clear and conductive.

Example 20

Non-Polymeric Small Organic Molecule

Anthracene was used as the release material in the vacuum chamber under the same conditions of Example 19, except that it was melted at 220° C. and flash-evaporated at about 300° C. and an IZO film about 500 Å thick was sputtered in-line on top of the release coating. The resulting IZO flakes were clear.

Example 21

Monofunctional Polymerizable Monomer

Liquid isobornylacrylate monomer was injected directly into a vacuum chamber operated at about 10$^{-4}$ torr to be flash-evaporated at about 220° C. The vapor was deposited as a liquid coating about 0.05-0.10 micron thick on a cold drum kept at about 0° C. The film was cured by exposure to an electron gun operating at 10 KV and 100 mA and then treated to smooth its surface with a plasma gas of composition 80% Ar, 20% O$_2$. An ITO film about 500 Å thick was sputtered in-line on top of the release coating. The resulting flakes were clear.

The ITO and IZO flakes so produced were compared to flakes produced by the method described in Ser. No. 10/355,373 (essentially the same, except that the release agent was not treated). Tables 3 and 4 below show the difference in the results obtained from the two processes (referred to as Prior Art and Invention). Optical density was measured using an optical densitometer (Model Cosar 70 Compupluse); and surface resistance as a function of conductivity was measured using a four-point probe. Both measurements were conducted on the film obtained from deposition.

TABLE 3

| (Optical Density) | | |
|---|---|---|
| | PRIOR ART | INVENTION |
| Example 18 | 1.2 | 0.6 |
| Example 19 | 0.9 | 0.4 |
| Example 20 | 1.0 | 0.3 |
| Example 21 | 0.8 | 0.3 |

TABLE 4

| (surface resistance, ohm/sq) | | |
|---|---|---|
| | PRIOR ART | INVENTION |
| Example 18 | 2000 | 500 |
| Example 19 | 4000 | 700 |
| Example 20 | 1500 | 350 |
| Example 21 | 2500 | 150 |

These examples demonstrate the improvements obtained by surface treating the release material with a plasma source or ion beam and, in the case of aluminum, also by passivating both sides of the aluminum film with a passivating treatment in the vacuum process of manufacturing flakes. The process possesses the advantage of producing flat, corrosion-resistant flakes with a controllably high aspect ratio, as needed to yield highly reflective aluminum paints and improved transparent conductive flakes suitable for inks and coatings used in various commercial applications. Because of the continuous operation and application of the materials over a rotating drum or moving web, the process produces flakes at much higher rates than prior-art chemical and mechanical techniques.

Various changes in the details, steps and components that have been described may be made by those skilled in the art within the principles and scope of the invention herein illustrated and defined in the appended claims. For example (the web 18 used to carry out the deposition may be pre-treated with a conventional plasma source 42, as shown in FIGS. 2 and 4, to improve its smoothness prior to deposition of the organic layer.

It is also clear that the process can be used advantageously to passivate any metallic multi-layer structure. The following example illustrates this advance in the art.

Example 22

Polymerizable Monomer

For instance, a multilayer aluminum and polymer composite material was produced for the purpose of making multilayer capacitors using the process configuration shown in FIG. 3. A hexanediol diacrylate monomer material was flash evaporated and deposited on a rotating drum at a thickness of 0.4 µm. The thin liquid layer was cross-linked using an electron beam. The surface of the polymer layer was then treated with an oxygen-based RF plasma, followed by deposition of a 5 ohm-per-square aluminum layer that was then segmented into multiple strips. The surface of the aluminum layer was passivated with an oxygen-based RF plasma. The process was repeated in a manner such that the aluminum strips in each electrode layer were offset to form left and right capacitor electrodes. The capacitor multilayer material (composed of thousands of such metal/polymer layers) was removed from the drum and cut into capacitor strips and chips with a capacitance value of 0.47 µmF (with a tolerance of +/−5%). Capacitor chips produced under these conditions were tested in a pressure cooker for 30 minutes, under steam conditions at 125° C. and 15 psi, with no visible corrosion of the aluminum electrodes or significant change in the capacitance value. For comparison, in the absence of the two passivation plasma treatment steps, the aluminum capacitor electrodes turned into a hydrated aluminum oxide (clear and transparent) after the pressure cooker test and the capacitance of the parts was reduced to zero.

Thus, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A process for producing flake elements, the process comprising:
    a) applying a liquid release layer on a substrate, said release layer having a first thickness;
    b) hardening a top surface of the liquid release layer to form a polymerized top surface a thickness of which is smaller than the first thickness;
    c) depositing a layer of first material on the polymerized top surface to form a multilayer structure on the substrate;
    d) reducing the multilayer structure, which has been removed from the substrate, to form flake elements.

2. A process of claim 1, further comprising repeating the steps a) through c) to form said multilayer structure that contains more than two layers.

3. A process of claim 1, wherein the applying a liquid release layer includes applying a liquid release layer on a rotating drum.

4. A process of claim 1, wherein the applying a liquid release layer includes applying a liquid release layer on a polymer web.

5. A process of claim 1, wherein the depositing a layer of first material includes depositing a metallic layer.

6. A process of claim 5, further comprising passivating a top surface of the metallic layer immediately after said depositing.

7. A process of claim 6, wherein said passivating includes passivating using gas plasma that comprises oxygen atoms.

8. A process of claim 1, wherein said hardening includes hardening with radiation.

9. A process of claim 1, wherein said hardening includes hardening with radiation generated by at least one of plasma and electron beam.

10. A process of claim 1, wherein said applying a liquid release layer includes applying an un-polymerized liquid release layer.

11. A process of claim 1, wherein said applying a liquid release layer includes applying at least one of a wax, an oligomer, and small organic molecules with molecular weight between 200 and 5,000.

12. A process of claim 1, wherein said depositing a layer of first material includes depositing first material containing at least one of a metal oxide, gold, silver, palladium, platinum, chromium, nickel, indium, and copper.

13. A process of claim 1, wherein said reducing the multilayer structure includes using a solvent.

14. A process for producing flake elements, the process comprising:
    a) applying an un-polymerized organic release layer on a substrate, said release layer having a first thickness;
    b) hardening a top surface of the un-polymerized organic layer to form a polymerized top surface a thickness of which is smaller than the first thickness;
    c) depositing a layer of first material on the polymerized top surface to form a multilayer structure on the substrate;
    d) reducing the multilayer structure, which has been removed from the substrate, to form flake elements.

15. A process of claim 14, further comprising repeating the steps a) through c) to form said multilayer structure that contains more than two layers.

16. A process of claim 14, wherein the applying an un-polymerized organic layer includes applying an un-polymerized organic layer on a rotating drum.

17. A process of claim 14, wherein the applying an un-polymerized organic layer includes applying an un-polymerized organic layer on a polymer web.

18. A process of claim 14, wherein the depositing a layer of first material include depositing a metallic layer.

19. A process of claim 18, further comprising passivating a top surface of the metallic layer immediately after said depositing.

20. A process of claim 19, wherein said passivating includes passivating using gas plasma that comprises oxygen atoms.

21. A process of claim 14, wherein said hardening includes hardening with radiation.

22. A process of claim 14, wherein said hardening includes hardening with radiation generated by at least one of plasma and electron beam.

23. A process of claim 14, wherein said applying an un-polymerized organic layer includes applying at least one of a wax, an oligomer, and small organic molecules with molecular weight between 200 and 5,000.

24. A process of claim 14, wherein said depositing a layer of first material includes depositing first material containing at least one of a metal oxide, gold, silver, palladium, platinum, chromium, nickel, indium, and copper.

25. A process of claim 14, wherein said reducing the multilayer structure includes using a solvent.

* * * * *